United States Patent
Hashimoto et al.

(10) Patent No.: US 9,452,495 B1
(45) Date of Patent: Sep. 27, 2016

(54) LASER SLICER OF CRYSTAL INGOTS AND A METHOD OF SLICING GALLIUM NITRIDE INGOTS USING A LASER SLICER

(75) Inventors: Tadao Hashimoto, Santa Barbara, CA (US); Sierra Hoff, Solvang, CA (US)

(73) Assignee: SixPoint Materials, Inc., Buellton, CA (US)

( * ) Notice: Subject to any disclaimer, the term of this patent is extended or adjusted under 35 U.S.C. 154(b) by 1025 days.

(21) Appl. No.: 13/543,009

(22) Filed: Jul. 6, 2012

Related U.S. Application Data

(60) Provisional application No. 61/505,990, filed on Jul. 8, 2011.

(51) Int. Cl.
*B23K 26/36* (2014.01)
*B23K 26/38* (2014.01)
*B23K 26/40* (2014.01)

(52) U.S. Cl.
CPC ...................................... *B23K 26/40* (2013.01)

(58) Field of Classification Search
CPC  B23K 26/367; B23K 26/408; G11B 5/3173; G11B 5/102
USPC ................. 156/345.11; 216/65, 76; 204/242; 205/655; 219/121.69, 121.85; 257/E21.306, E21.309, E21.347, 103
See application file for complete search history.

(56) References Cited

U.S. PATENT DOCUMENTS

| | | | | |
|---|---|---|---|---|
| 3,128,213 A | * | 4/1964 | Moross et al. ................. | 438/460 |
| 3,527,198 A | * | 9/1970 | Takaoka ...................... | 125/30.01 |
| 4,009,723 A | * | 3/1977 | Stungis ..................... | A24C 5/28 |
| | | | | 131/280 |
| 4,113,587 A | * | 9/1978 | Chikamori .................... | 205/651 |
| 4,283,259 A | * | 8/1981 | Melcher et al. ............... | 205/646 |
| 4,379,022 A | * | 4/1983 | Melcher et al. ................ | 216/94 |
| 4,473,737 A | * | 9/1984 | Anthony .................. | 219/121.71 |
| 4,809,196 A | * | 2/1989 | Miller ................................ | 436/4 |
| 5,041,189 A | * | 8/1991 | Sandaiji et al. ................. | 216/22 |
| 5,057,184 A | * | 10/1991 | Gupta et al. ..................... | 216/65 |
| 5,378,449 A | * | 1/1995 | Dinges ........................... | 423/579 |
| 5,912,186 A | * | 6/1999 | Yoshino et al. .............. | 438/708 |
| 6,049,058 A | * | 4/2000 | Dulaney et al. ......... | 219/121.84 |
| 6,262,390 B1 | * | 7/2001 | Goland et al. ........... | 219/121.85 |
| 6,730,447 B2 | * | 5/2004 | Ito et al. ......................... | 430/22 |
| 7,464,702 B2 | | 12/2008 | Matsumoto | |

(Continued)

FOREIGN PATENT DOCUMENTS

| | | | | | |
|---|---|---|---|---|---|
| JP | | 58221690 A | * | 12/1983 | ............. B23K 26/00 |
| JP | | 61037981 A | * | 2/1986 | ................ C23F 1/08 |

(Continued)

OTHER PUBLICATIONS

Minsky, M.S., et al., "Room-Temperature Photoenhanced Wet Etching of GaN," American Institute of Physics, APL, vol. 68, No. 11, Mar. 11, 1996, pp. 1531-1533.

(Continued)

*Primary Examiner* — Quang Van
(74) *Attorney, Agent, or Firm* — Strategic Innovation IP Law Offices, P.C.

(57) ABSTRACT

The present invention discloses a new tool to slice crystal ingots by using laser beams. Ingot crystals of III-nitride such as GaN are immersed in alkali solutions and irradiated with scanned lines of laser beams to slice wafers out of the ingots. The method is expected to achieve approximately one order of magnitude smaller slicing loss with minimized slicing damage.

15 Claims, 4 Drawing Sheets

(56) References Cited

U.S. PATENT DOCUMENTS

| | | | |
|---|---|---|---|
| 2002/0050489 A1* | 5/2002 | Ikegami et al. | 219/121.69 |
| 2008/0006844 A1* | 1/2008 | D'Evelyn | C30B 7/10 257/103 |
| 2008/0008855 A1* | 1/2008 | D'Evelyn et al. | 428/141 |
| 2008/0069997 A1* | 3/2008 | Sugawara et al. | 428/58 |
| 2009/0114619 A1* | 5/2009 | Sotoaka et al. | 216/48 |
| 2009/0194512 A1* | 8/2009 | Kuo et al. | 219/69.17 |
| 2010/0170877 A1* | 7/2010 | Sano et al. | 219/72 |
| 2010/0226655 A1* | 9/2010 | Kim | 398/139 |

FOREIGN PATENT DOCUMENTS

| | | | | |
|---|---|---|---|---|
| JP | 61078588 A | * | 4/1986 | B23K 26/12 |
| JP | 61159581 A | * | 7/1986 | C23F 4/04 |
| JP | 61206587 A | * | 9/1986 | B23K 26/12 |
| JP | 61238986 A | * | 10/1986 | C23F 1/08 |
| JP | 01222071 A | * | 9/1989 | C23F 4/04 |
| WO | WO 2007019493 A2 | * | 2/2007 | |

OTHER PUBLICATIONS

Stonas, A.R., et al., "Development of Selective Lateral Photoelectrochemical Etching of InGaN/GaN for Lift-Off Applications," American Institute of Physics, APL, vol. 78, No. 13, Mar. 26, 2001, pp. 1945-1947, DOI: 10.1063/1.1352663.

Ko, C.H. et al., "Photo-Enhanced Chemical Wet Etching of GaN," Elsevier, Materials Science & Engineering B96, Oct. 2002, pp. 43-47.

* cited by examiner

LASER SLICER OF CRYSTAL INGOTS AND A METHOD OF SLICING GALLIUM NITRIDE INGOTS USING A LASER SLICER

CROSS-REFERENCES TO RELATED APPLICATIONS

This application claims priority to U.S. App. No. 61/505,990 entitled "A LASER SLICER OF CRYSTAL INGOTS AND A METHOD OF SLICING GALLIUM NITRIDE INGOTS USING A LASER SLICER" and filed Jul. 8, 2011, by inventor Tadao Hashimoto, the entire contents of which are incorporated by reference herein as if put forth in full below.

BACKGROUND OF INVENTION

1. Field of the Invention

The invention is related to a tool to slice ingots (i.e. boules or bulk crystals) of group III nitride crystals such as gallium nitride (GaN), indium nitride (InN), aluminum nitride (AlN) and their solid solutions. Also, the invention discloses a method to slice ingots of group III nitride crystals to fabricate wafers of group III crystals.

2. Description of the Existing Technology and Some of its Problems

Slicing a crystal ingot is the most common way to obtain crystalline wafers used in various applications such as electronic or optoelectronic devices. A multiple wire saw, an outer blade saw, and an inner blade saw are commonly used tools to slice wafers out of a crystal ingot. Among these methods, the multiple wire saw is more commonly used than the blade saws because the multiple wire saw enables multiple slices in one run and the slicing margin is thinner than that of solid blades. The slicing margin of the multiple wire saw is determined by the wire thickness and the slurry size. It is typically between 150 to 200 microns, depending on the hardness of the crystal and slicing conditions. The multiple wire saw is widely used to slice semiconductor crystals such as silicon (Si), gallium arsenide (GaAs), gallium phosphide (GaP), indium phosphide (InP), and silicon carbide (SiC).

Gallium nitride (GaN) and its related solid solutions explained as $Al_xGa_yIn_{1-x-y}N$ ($0 \leq x \leq 1$, $0 \leq y \leq 1$) are highly enabling materials in optoelectronic and electronic devices. Since GaN and its related solid solutions do not have a liquid phase under the standard pressure, it has been extremely difficult to grow the crystal in ingot shape. Recent progress in crystal growth technology enabled ingot growth of III-nitrides; however, a decent slicing technique has not fully been developed yet. The (U.S. Pat. No. 7,464,702 B2)[1] discloses one method of slicing GaN ingots with a multiple wire saw. GaN wafers are sliced from GaN ingots with a slicing margin of 160 to 280 microns. Since the typical wafer thickness is 300~400 microns, the kerf loss (i.e. the loss for the slicing margin) can be as high as 48%. Considering the cost of growing III-nitride ingots, there is a strong demand to minimize the slicing margin. However, it is quite difficult for the multiple wire saw to attain slicing margin smaller than 100 microns because thinner wires will not have sufficient strength to slice crystal ingots, especially hard materials such as GaN.

SUMMARY OF THE INVENTION

To overcome the above-mentioned challenges, the present invention provides a new tool to slice ingots of crystals, especially III-nitride crystals. Also, the present invention provides the method to slice ingots of III-nitride crystals. To minimize the slicing margin, the new tool utilizes laser light rather than the mechanical cutting. In addition, the new tool does not use the laser ablation process which requires extremely high optical power. The slicing tool of the present invention utilizes photo-enhanced etching, which is reported in References [2] and [3]. Photo-enhanced etching is carried out in an alkali solution under the irradiation of ultraviolet light to etch GaN or its related solid solutions, which are not etched by strong acid or base without photo irradiation. Based on this etching technique, we developed a system to apply the photo-enhanced etching for slicing ingots of III-nitride crystals. A new design of slicing tool for III-nitride ingots is developed to produce wafers of III-nitride crystals. In addition, the present invention presents the new method of slicing ingots of III-nitride crystals.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description of the Invention

Group III-nitride crystals such as GaN and its related solid solutions can be etched chemically in alkali solutions under UV light irradiation [2][3]. We developed a system to utilize this nature to selectively create grooves by utilizing scanned laser beams. Since the photo-enhanced etching involves electron-hole pairs generated by photo irradiation, the laser is selected so that the photon energy of the laser beam is higher than the band gap energy of the ingot crystal. In the case of GaN, the photon energy must be higher than approximately 3.45 eV, which corresponds to shorter wavelength than approximately 360 nm. Gas lasers such as XeF laser (351 nm), He—Cd laser (325 nm), $N_2$ laser (337 nm), XeCl laser (308 nm) can be used for GaN. For AlN, shorter wavelength is needed. For InN, longer wavelength can be used.

Figure 1:
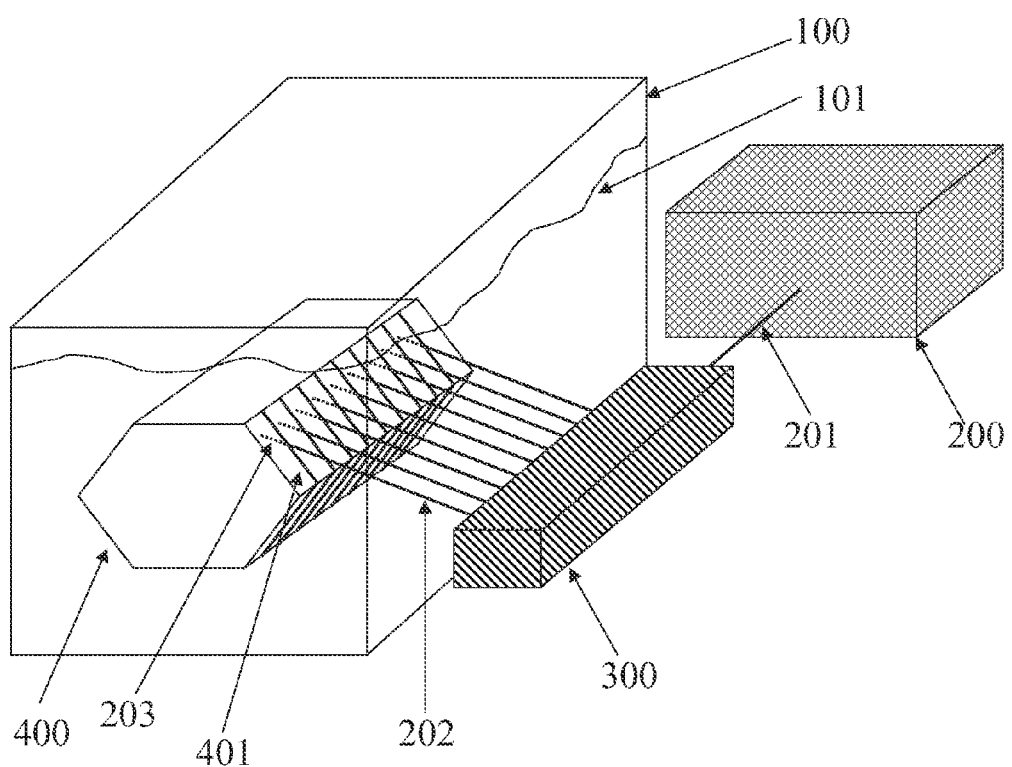
FIG. 1 is one construction of slicing tool.
100 Transparent bath
101 Alkali solution
200 Ultraviolet gas laser
201 Primary laser beam
202 Split laser beam
203 Laser beam propagating in the groove
300 Laser splitting and scanning device
400 Crystal ingot
401 Groove made by slicing action

FIG. 1 shows an example design of the tool. A crystal ingot 400 is mounted inside a transparent bath 100, in which alkali solution 101 is filled. The primary laser beam 201 generated from an ultraviolet gas laser 200 is introduced to the laser splitting and scanning device 300 which splits the primary laser beam 201 and scans the split laser beams 202. The laser beams 202 are targeted on a side of the crystal ingot 400 where photo-enhanced etching occurs. Scanning of the laser beams 202 creates a series of grooves 401 on the side of the crystal ingot 400. Continuing the etching process will achieve full slicing of the crystal ingot 400.

One important design criteria is the divergence angle of the laser beams 202 because the laser beam must reach the etching front, which becomes deeper as slicing progresses. The laser divergence angle must be less than the value which allows the laser beams to reach at least the half point of the ingot crystal. It is preferably less than 0.01 degree, more preferably, less than 0.001 degree. With small enough divergence, one can fully slice the ingot by targeting the laser beams on one or more side walls. If the divergence angle is small enough to reach the other side of the ingot through the groove, laser beams can be simply targeted from one side; however, in this case, slicing margin becomes larger on the side of the laser irradiation and smaller on the other side. Assuming the ingot diameter of 100 mm (~4"), the beam divergence angle of 0.001 degree will result in 1.7 micron increase of the slicing margin. To attain uniform slice thickness, it may be preferable to shine the laser beam from multiple directions so that a single slice is made from two or more locations around the periphery of the ingot.

Figure 2:
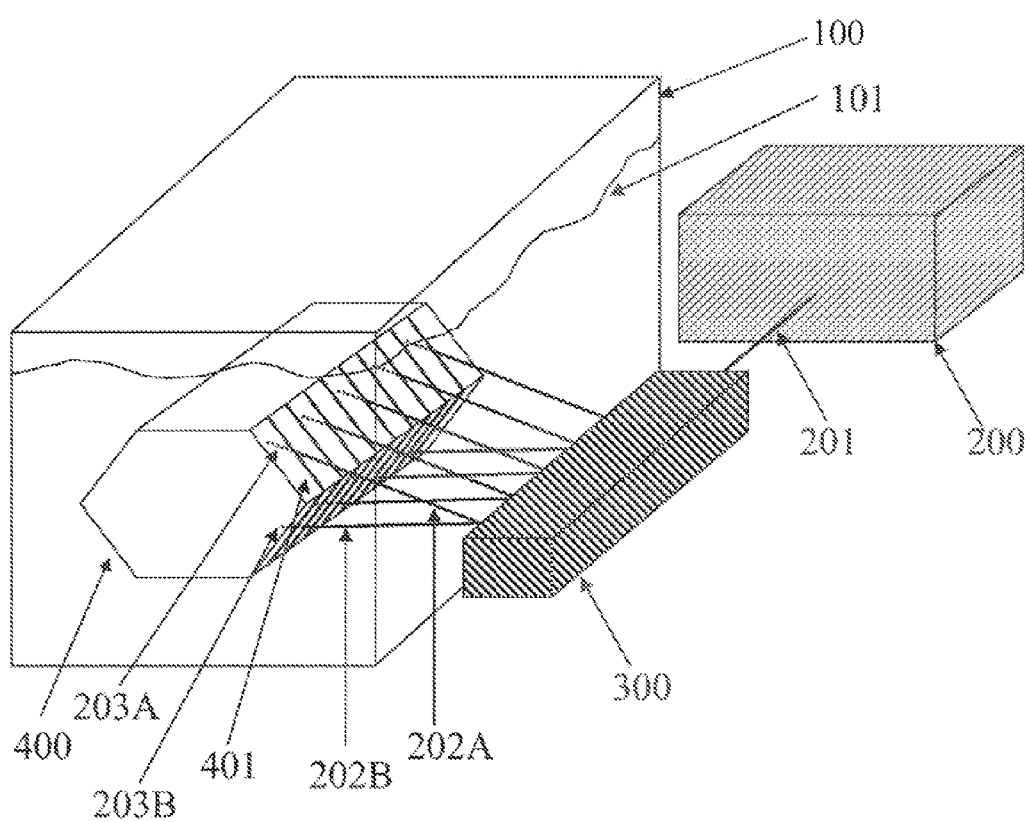
FIG. 2 is one construction of slicing tool.
100 Transparent bath
101 Alkali solution
200 Ultraviolet gas laser
201 Primary laser beam
202A Split laser beam of scanning phase A
202B Split laser beam of scanning phase B
203A Laser beam propagating in the groove for the scanning phase A
203B Laser beam propagating in the groove for the scanning phase B
300 Laser splitting and scanning device
400 Crystal ingot
401 Groove made by slicing action

Another important point to consider is a clear separation of the etching grooves. If the laser beams overlap together, clear slicing is not achieved. Since the distribution of optical intensity in one beam is typically a Gaussian function, overlapping the tails of the envelope may create enough light intensity to induce photo-enhanced etching. Another cause of etching overlap may be caused by diffusion of generated carriers. If the diffusion length of the photo-excited carriers is long, the groove width becomes significantly larger than the laser beam spot. To attain clear slicing, it is preferable to focus the laser beam to attain a spot size smaller than 50 microns, more preferably smaller than 10 microns. If necessary, the laser beam can be divided in a few groups and each group can be scanned asynchronously as shown in FIG. 2. In this figure, laser beams are divided into group A and group B and each group is scanned asynchronously. Depending on the slicing pitch and slicing conditions, one can divide the beams into 2 or more groups.

If the etching process generates gas bubbles, the bubbles may scatter the laser beams. Also, etching of the ingot crystal may cause uneven concentration of the alkali solutions. Therefore, it is preferable to stir the alkali solution in the bath. If desired, ultrasonic vibration and/or solution recirculation can be added to remove gas bubbles and/or assure more consistent concentration within the sliced grooves.

Example 1

Figure 3:
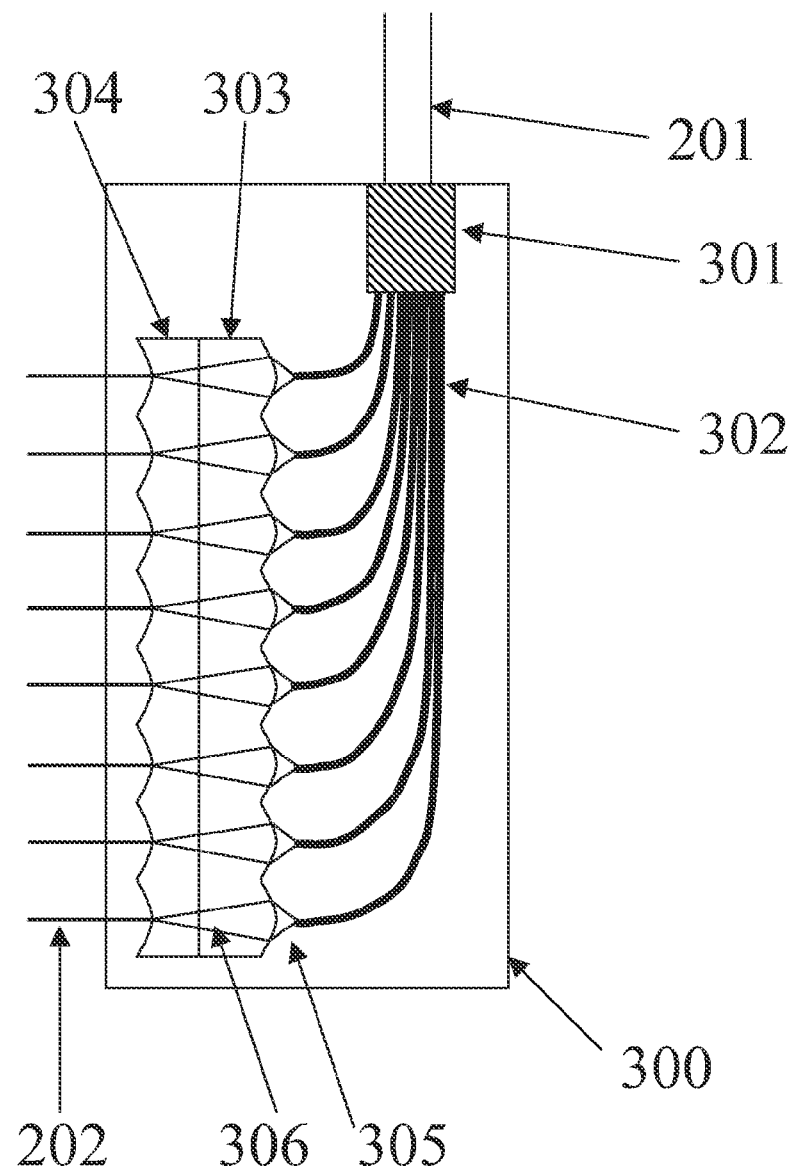
FIG. 3 is top view of one construction of laser splitting and scanning device.
201 Primary laser beam
202 Split laser beam
300 Laser splitting and scanning device
301 Input window for optical fiber based beam splitter
302 Optical fibers
303 Plano-convex lens array
304 Plano-concave lens array
305 Optical path coming out of the optical fiber
306 Optical path being focused

A laser slicing tool is designed to slice 4"-diameter ingot crystals of GaN or GaN-based solid solutions. An ingot or multiple ingots are mounted on a stage inside the solution bath 100. The bath is filled with solution of 3.0 M KOH. An excimer (XeCl) laser is used to produce the primary laser beam 201 having wavelength of 308 nm. The total average output power of the excimer laser is 600 mJ per pulse. After a laser beam homogenizer having 80% efficiency, the primary laser beam with 95% uniformity is introduced to the beam splitting and scanning device 300 with appropriate focusing and collimation. The detailed drawing of the beam splitting and scanning device is presented in FIG. 3. The primary laser beam 201 is split by UV optical fibers. In this design, the target thickness of the sliced wafer is 380 microns with a slicing margin of 20 micron. The maximum length of GaN boule is specified to be 100 mm, which requires 250 lines of laser beams separated by 400 microns. A plano convex lens array 303 is used to focus laser beam coming out of the array of optical fibers onto a plano concave lens array 304. The pitch of the lens array is designed so that the laser beams will have the required separation. The diameter of the focused beam on the plano concave lens is 10 micron. Then, the beam shape is straightened with the plano concave lens array. The parallel lines of the collimated beams are scanned on the side of the crystal ingot by rocking the entire beam splitting and scanning device 300. Extra care is made to make the sidewall of the solution bath perpendicular to the beam path, so that the diffraction of the light does not change slicing pitch. The designed beam diameter on the crystal ingot is 10 microns. Assuming 60% of power loss in the optics, the power density of each laser beam on the crystal ingot is 1.2 kJ/cm² per pulse. The repetition rate of the pulse is 600 Hz. The scanning rate of the beam splitting and scanning device 300 is 30 degree per second. This gives one laser shot every 86 microns on the scanning line (i.e. along the groove). The random laser shots along the scanning line will make uniform etching along the scanning line. The total rocking angle is −15 degree to +15 degree to slice 4-inch diameter ingot, assuming the distance from the crystal ingot 400 and the beam splitting and scanning device 300 is 30 cm.

Example 2

Figure 4:
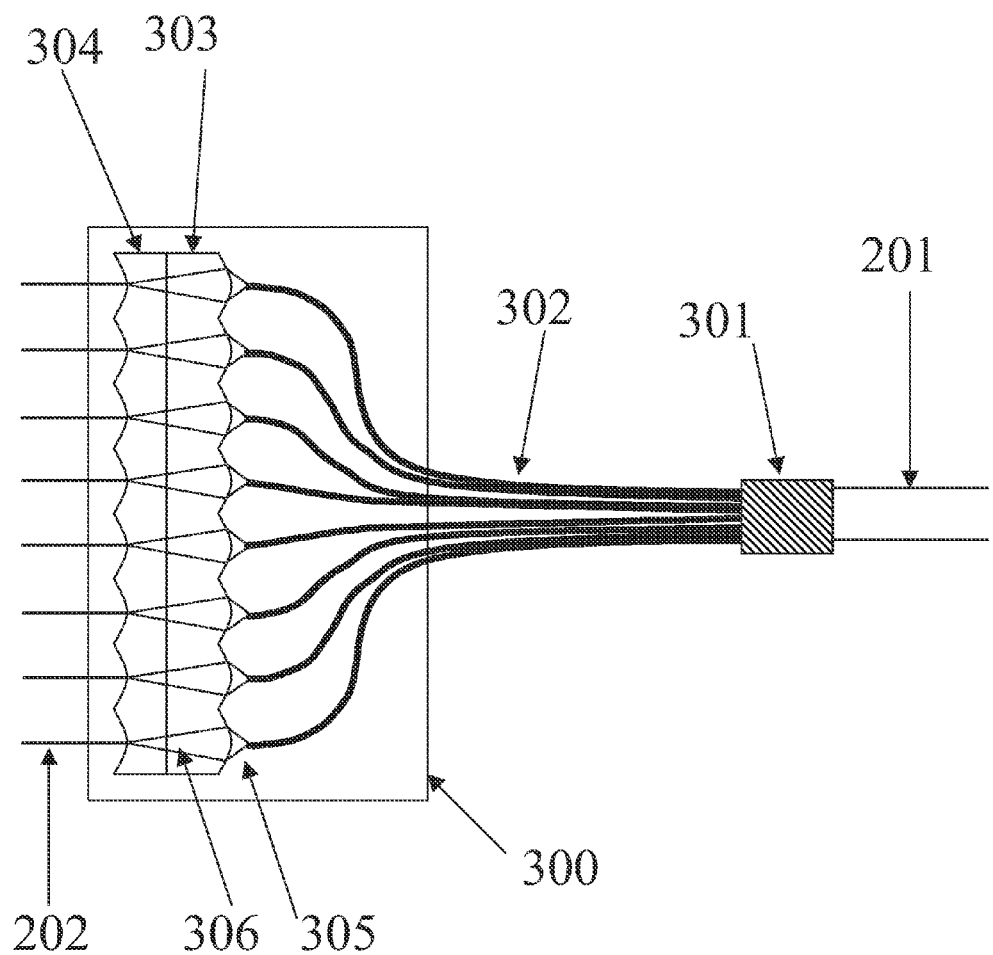
FIG. 4 is top view of one construction of laser splitting and scanning device.
201 Primary laser beam
202 Split laser beam
300 Laser splitting and scanning device
301 Input window for optical fiber based beam splitter
302 Optical fibers
303 Plano-convex lens array
304 Plano-concave lens array
305 Optical path coming out of the optical fiber
306 Optical path being focused

A laser slicing tool using another design of beam splitting and scanning device 300 is presented in FIG. 4. Instead of making 90 degree bending of the optical fibers, this design uses straight guiding of the optical fibers. The primary laser beam 201 is introduced into the beam splitting and scanning device 300. The optical input window 301 is located outside of the beam splitting and scanning device 300. In this way, the beam splitting and scanning device can be located either inside or outside of the bath 100 for the alkali solution while keeping the input window 301 outside of the bath 100.

Example 3

Instead of irradiating one side of the ingot, multiple locations on the ingot sidewall can be irradiated with the laser array. In this case, extra care has to be made to align the laser beam so that the locations of the slicing groove matches together.

Example 4

Slicing method of III-nitride ingots is presented in this example. Using the laser slicing tool presented in Example 1, GaN ingots are expected to be sliced at a faster speed than using a multiple wire saw. Since the typical thickness of a GaN ingot is 5 to 10 mm, several ingots are mounted on a metal base with conventional wax. To protect the surface (i.e. Ga-face and N face) of the ingots, glass blocks may be attached to the both ends of the ingots with conventional wax. In such case, appropriate beam shields in front of the glass blocks may be necessary to avoid unnecessary stray beams. Extra care must be made to align the GaN crystals against the metal base. If necessary, the crystal orientation may be confirmed with X-ray diffraction. After mounting the GaN ingot crystals, the metal base is mounted inside the solution bath and 3.0M KOH solution is supplied in the bath. The concentration of the alkali solutions may be adjusted to attain clear and smooth cut of the crystal ingots. It is preferable to immerse the entire crystal in the solutions. The KOH solution is stirred continuously using a magnetically coupled stirrer. Other methods of stirring can also be used if it does not create air bubbles. The laser beams are targeted on the sidewall of the ingots with a scanning rate of 30 degree per second. The laser beam repetition rate is 600 Hz and the laser power is 600 mJ/pulse. This energy is expected to be sufficient to attain slicing speed of 100 microns per minute, which is 6 mm per hour. GaN ingots having 2" diameter are expected to be sliced in approximately 8.5 hours, and GaN ingots having 4" diameter are expected to be sliced in approximately 17 hours. After slicing the ingots, the KOH solution is drained out of the bath and the metal base is removed from the solution bath. The metal base may be removed without draining the KOH solution if the operator wears enough protective gear to handle the alkali solution. Then, the sliced crystal ingots with metal base are rinsed with deionized water to remove the KOH solution. The sliced wafers are removed from the metal base by immersing them in an acetone bath. As-sliced wafers are cleaned with solvents and dried in an oven. The surface of the as-sliced wafers are polished so that electronic or optoelectronic devices can be fabricated on the wafer surface. This new method is expected to yield 25 wafers having thickness of 380 microns out of 100 mm-thick ingots with a slicing margin of 20 micron. If the conventional multiple wire saw is used, 100 mm-thick ingots will yield 18 wafers of 380 micron-thick with a slicing margin of 170 micron.

Advantages and Improvements

The present invention discloses a new tool to slice crystal ingots with laser beams. Compared with the existing multiple wire saw, the new tool has the following advantages:
1) The slicing margin is about 1/10 of that of the wire saw, which directly affect the cost of the produced wafer.
2) Since the slicing does not involve physical removal of the material, the damaged layer associated with slicing is minimized.

REFERENCES

All references discussed in the application are incorporated by reference herein,
[1] U.S. Pat. No. 7,464,702 B2.
[2] M. S. Minsky, M. White, and E. L. Hu, Applied Physics Letters 68 (1996) 1531.
[3] A. R. Stonas, T. Margalith, S. P. DenBaars, L. A. Coldren and E. L. Hu, Applied Physics Letters 78 (2001) 1945.

CONCLUSION

This concludes the description of preferred embodiments of the invention. The following describes some alternative embodiments for accomplishing the present invention.

Although the example described the construction in which the optical components are located outside the bath, some optical components can be placed in the alkali solution bath to minimize the diffraction of the beam path caused by the difference of refractive index among air, the bath material, and the alkali solution.

Although the example described shining the laser beams from a distant position, the laser beams can be shined at a position close to the cutting front by using optical fibers. Also, the scanning of light can be attained by physical motion of the optical fibers.

Although the example described a design using excimer (XeCl) laser, other gas lasers such as XeF laser (351 nm), He—Cd laser (325 nm), $N_2$ laser (337 nm) can be used. Also solid-state lasers such as semiconductor lasers can be used if optical power is sufficient.

Although the example described a beam splitting with optical fibers, other methods of beam splitting such as stack of conventional beam splitters, using grating, and using interference patterns can be applied to split the primary laser beam.

Although the example described the combination of plano convex and plano concave lens array to attain multiple laser beams with a small divergence angle, other combination of optics can be used as long as it will create multiple laser beams with small enough divergence angle. Also, the plano convex and plano concave lens arrays may not necessarily focus and shape the laser beam along the scanning directions, i.e. the beam spot shape can be ellipsoid with longer dimension along the scanning directions. This kind of laser spot may be beneficial to increase etching speed due to wider irradiation area along the scanning direction.

Although the example described a transparent bath for alkali solution, a non-transparent bath with an optical window can be used as long as the laser beams can be transmitted.

Although the FIGS. 1 and 2 present a configuration that laser beams are shined from a-direction <11-20> of the crystal, irradiation on m-plane {1-100} or other crystallographic orientation can also be used. The irradiation angle may affect the cracking property or slicing damage of the sliced wafers, so it should be carefully determined depending on the ingot material and slicing conditions. Also, in the case of fabricating non-polar or semi-polar substrate, the laser beam can be shined from the appropriate angles to obtain such wafers.

Although the embodiment primarily explained a tool with laser scanning, the same slicing property can be attained by rocking the crystal ingots relative to the laser beam. In such case, extra care must be taken to align the crystal ingots relative to the rocking plane. Also, the laser scanning and ingot rocking can be combined.

Although the example described a wafer slicing tool with 400 micron pitch, other slicing pitch can be attained by properly designing the beam splitting and scanning device. Although the example described a tool to slice an ingot having a diameter of 4", the tool can be designed to slice crystal ingots having larger diameter. Also, the same method can be applied to slice crystal ingots having larger diameter than 4".

Although the example described a tool with maximum ingot length of 100 mm, a tool having a capacity of slicing longer ingots can be designed simply by increasing the number of laser beams.

Although the example described a rocking mechanism of the beam splitting and scanning device to scan the laser beams, other methods such as rotating polygon mirrors can be used to scan the laser beams.

What is claimed is:

1. A tool to slice ingots of crystals comprising:
   (a) a reservoir to supply an alkali solution on a cutting front of an ingot, wherein the ingot is gallium nitride or its solid solution with aluminum nitride or indium nitride;
   (b) a laser configured to shine a laser beam on the cutting front;
   wherein the laser beam has a photon energy higher than a band gap of the ingot and a sufficiently small divergence angle to cut through the ingot by illuminating the cutting front as the cutting front progresses through the ingot; and
   (c) a beam splitter to generate multiple beams of laser light configured to produce multiple cutting fronts in the ingot simultaneously, wherein a spacing of the beams determines the thickness of a wafer cut from the ingot.

2. The tool of claim 1 wherein the ingot is immersed in the alkali solution.

3. The tool of claim 1, further comprising a scanner for scanning the laser beam across a surface or the cutting front of the ingot.

4. The tool of claim 3, wherein the scanner comprises said beam splitter.

5. The tool of claim 3, wherein the laser beam has a spot size smaller than 50 microns in a direction perpendicular to a scanning direction.

6. The tool of claim 1, wherein the laser beam has a spot size that enables a slicing margin of less than 100 microns.

7. The tool of claim 1, wherein the reservoir contains KOH or NaOH.

8. The tool of claim 1, wherein the laser is an ultraviolet gas laser.

9. A method of slicing an ingot of group III nitride crystals comprising,
   (a) immersing the ingot in an alkali solution
   (b) shining a laser beam to a cutting front of the ingot
   wherein the laser beam has a photon energy higher than the band gap of the ingot and a small enough divergence angle to reach the cutting front of the ingot through the gap of the already cut portion, wherein the laser beam is split into multiple beams of laser light that cut multiple slices simultaneously, and wherein the ingot is gallium nitride or its solid solution with aluminum nitride or indium nitride.

10. The method of claim 9, further comprising scanning the laser beam across a surface of the ingot.

11. The method of claim 9, wherein a spacing of the beams determines a thickness of a wafer cut from the ingot.

12. The method of claim 9, wherein a spot size of the laser beam enables a slicing margin of less than 100 microns.

13. The method of claim 9, wherein a spot size of the laser beam perpendicular to the scanning direction is less than 50 microns.

14. The method of claim 9, wherein the alkali solution is KOH or NaOH.

15. The method of claim 9, wherein the laser beam is generated by an ultraviolet gas laser.

* * * * *